No. 12,834. REISSUED JULY 28, 1908.
G. C. BEIDLER.
MACHINE FOR EXPOSING AND DEVELOPING PHOTOGRAPHIC FILMS.
APPLICATION FILED JAN. 16, 1907.
3 SHEETS—SHEET 1.
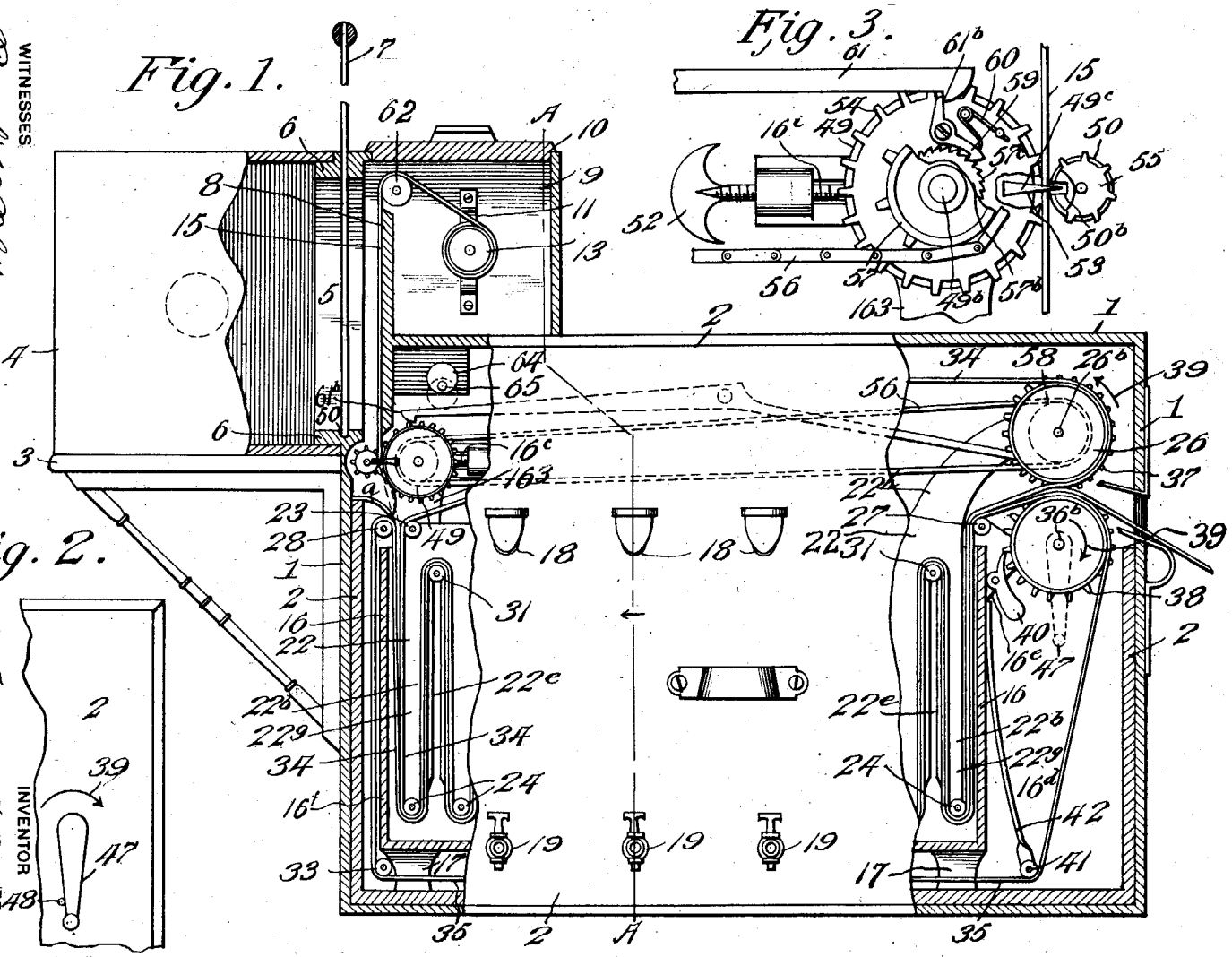
WITNESSES:
Frank B. Hoffman
Wilfred C. Lawson
INVENTOR
George C. Beidler
G. Franks Appleman
Atty.

No. 12,834. REISSUED JULY 28, 1908.

G. C. BEIDLER.

MACHINE FOR EXPOSING AND DEVELOPING PHOTOGRAPHIC FILMS.

APPLICATION FILED JAN. 16, 1907.

3 SHEETS—SHEET 2.

WITNESSES

Frank B. Hoffman

Wilfred C. Lawson

INVENTOR

George C. Beidler by Frances Appleman Atty

No. 12,834. REISSUED JULY 28, 1908.

G. C. BEIDLER.

MACHINE FOR EXPOSING AND DEVELOPING PHOTOGRAPHIC FILMS.

APPLICATION FILED JAN. 16, 1907.

3 SHEETS—SHEET 3.

WITNESSES

Frank B. Hoffman.

Wilfred C. Lawson.

INVENTOR

George C. Beidler by Francis Appleman

Atty

UNITED STATES PATENT OFFICE.

GEORGE C. BEIDLER, OF OKLAHOMA, OKLAHOMA, ASSIGNOR, BY MESNE ASSIGNMENTS, TO THE RECTIGRAPH COMPANY, OF OKLAHOMA, OKLAHOMA, A CORPORATION OF OKLAHOMA.

MACHINE FOR EXPOSING AND DEVELOPING PHOTOGRAPHIC FILMS.

No. 12,834. Specification of Reissued Letters Patent. Reissued July 28, 1908.

Original No. 810,388, dated January 23, 1906, Serial No. 197,846. Application for reissue filed January 16, 1907. Serial No. 352,666.

*To all whom it may concern:*

Be it known that I, GEORGE C. BEIDLER, a citizen of the United States, residing at Oklahoma city, in the county of Oklahoma and State of Oklahoma, have invented a new and useful Machine for Exposing and Developing Photographic Films, of which the following is a full, clear, and exact description, reference being had to the accompanying drawings.

The object of this invention is to provide a single machine which will hold a supply of sensitive paper, celluloid, or other suitable film, which will make the exposure to the light necessary to produce the photographic image on said film, which will subject the film, after exposure, to the necessary developing, fixing, and washing agents, and which will deliver the film in the form of separate finished photographic prints.

A further object of this invention is to provide means for supporting the film centrally or intermediate its edges to prevent sagging and to cause the film to remain on the carrier or conveyer.

The new machine attaches to a camera after the manner of the common plate holder and being necessarily larger than the usual plate holder or even the camera, is provided with a shelf or support upon which the camera rests.

In using the machine, a supply of sensitive film is placed within it and drawn through an exposing chamber and fed to a carrier. These carriers are preferably mounted upon rollers in such manner as to lie in gripping contact with each other and they pass in proper order through the several developing, fixing, and washing solutions, the exposed film being carried entirely through said solutions by said carriers.

Other objects and advantages of the invention will be set forth in the ensuing description.

Figures 4, 5, 6:
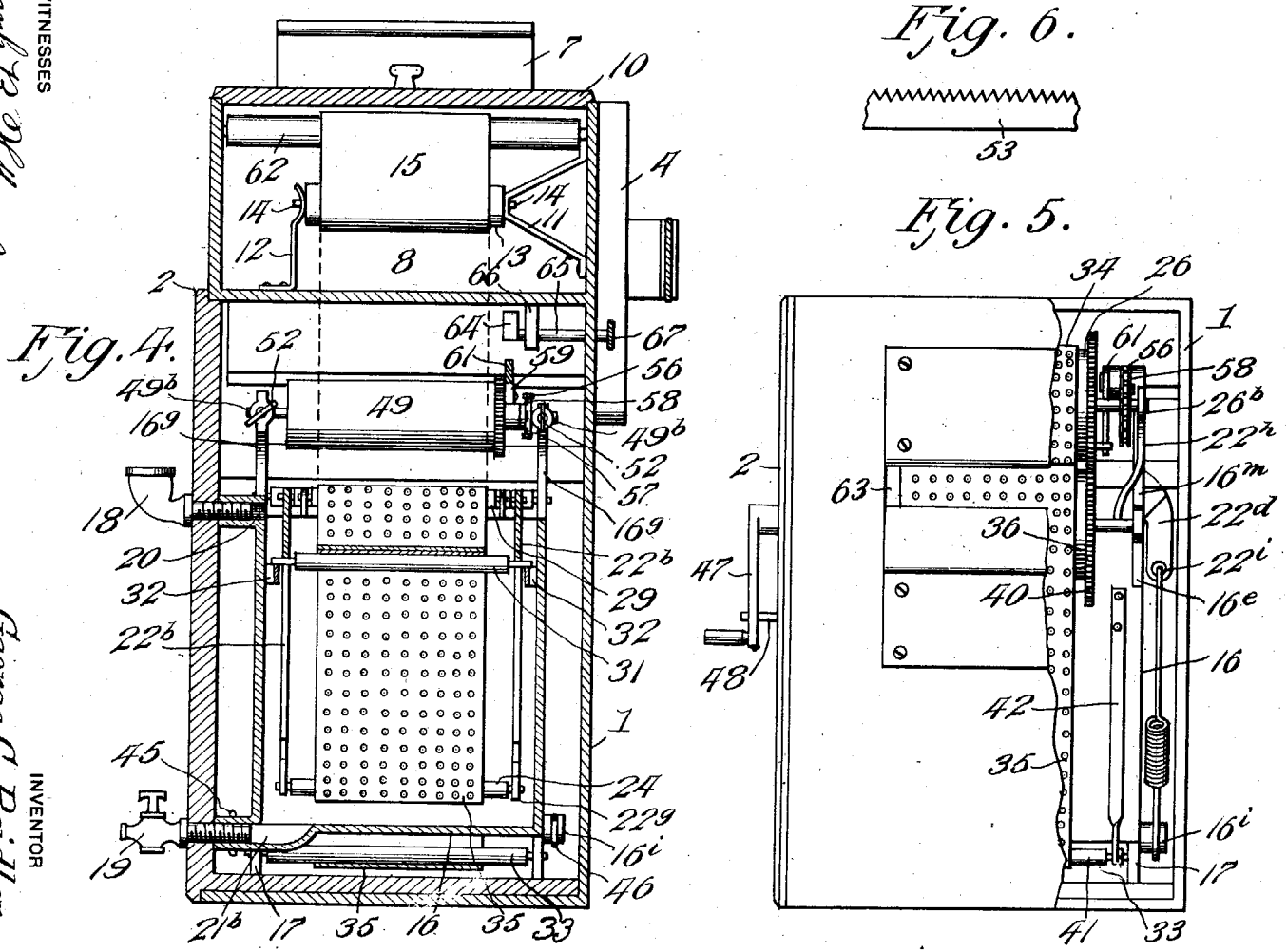
Figures 7, 8, 9, 10:
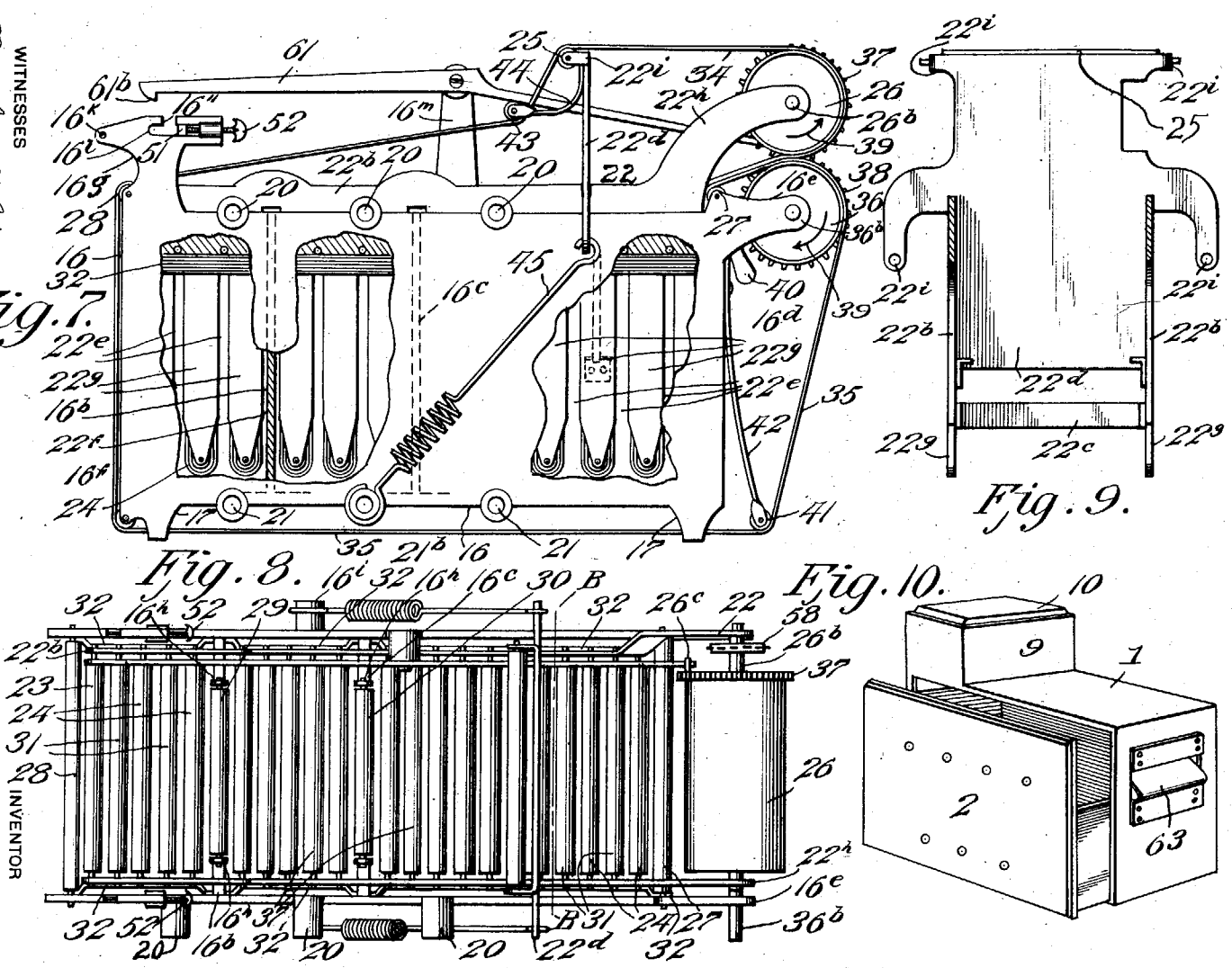

Referring to the drawings; Figure 1, is an elevation of the machine attached to a camera, parts being cut away to expose interior construction, the camera in this instance being the style in which a reflecting mirror is employed to invert the image; Fig. 2, is an elevation of the portion that is cut away in the right hand portion of Fig. 1; Fig. 3, is an elevation of the opposite end of a roller and its adjacent parts shown in the left hand portion of Fig. 1; Fig. 4, is a sectional view, taken on the line A—A, Fig. 1; Fig. 5, is an elevation of the right hand end of the structure shown in Fig. 1; Fig. 6, is a detail to be referred to later; Fig. 7, is an elevation of the developing tray and most of its attached parts, taken in the same direction as Fig. 1, parts being cut away to expose interior construction; Fig. 8, is a plan view of the parts shown in Fig. 7; Fig. 9, is a sectional view taken on the line B—B, Fig. 8; and Fig. 10, is a perspective view of the inclosing casing of the machine, Figs. 3 and 6, being on a larger scale and Fig. 10, on a smaller scale than the other figures.

Referring to the several figures in all of which like characters of reference designate like parts, the main body of the structure consists of a wooden casing 1, into which a drawer portion 2, fits with joints that are light-proof. The body 1, has a shelf 3, upon which the camera 4, rests, and is provided with an exposing chamber 5, similar to the ordinary plate-holder. The chamber 5, has the usual flange or nipple 6, to fit into the camera and is provided with the light-excluding slide 7. The exposing chamber 5, has a back-wall 8, which acts as a backing for the film while being exposed, and back of said wall is a film chamber 9, provided with a door or removable top 10. The film chamber 9, is provided with a metal bracket 11, and an elastic sheet metal arm 12, for holding the spool 13, upon which a supply of film is wound, the bracket being secured to the side wall of the chamber, and the arm to the bottom thereof. The pintles 14, of the spool 13, pass through eyes in the bracket 11, and the arm 12, and said pintles may be removed by springing said arm outward. The elastic force of the arm 12, presses the spool 13, against the bracket and gives said spool sufficient drag to retain the film 15, taut while being exposed or drawn through the exposing chamber 5.

The main body of the structure is provided with the drawer-portion 2, aforesaid and in said drawer a developing tray 16, and all parts attached to it are mounted; the legs 17, of the tray resting upon the drawer bottom. The tray 16, and all parts attached to it are removable from the casing 1, with the drawer 2, without the necessity of disconnecting any part of the machine whatever, and said tray is divided into as many compartments as there are developing solutions used, of which in the present instance there are three and each compartment has a filling funnel 18, and emptying cock 19. The funnels 18 and cocks 19, are mounted upon the outside face of the drawer front 2, and their tubular stems extend through said drawer front and are screw-threaded into the protuberated openings 20 and 21, respectively, in the top and bottom of the compartments, thereby securing said tray to the drawer front. Mounted within the tray 16, is a sheet metal frame-work 22, composed of the side portions $22^b$, the cross-bars $22^e$, and the sheet metal diaphragm $22^d$. The side portions $22^b$, are each provided with open-bottomed slots $22^e$ and $22^f$ which form the portions between them into downwardly extending fingers reaching well toward the bottom of the tray 16, the slots $22^f$, straddling the partitions $16^b$ and $16^c$, between the tray compartments. At one end of the framework 22, the side pieces $22^b$, are provided with arms $22^h$, extending upward and outward over the end $16^d$, of the tray and revolubly supporting the end pintles $26^b$, of a main apron-driving roller 26. Said framework 22, also carries a small roller 23, at its opposite end whose pintles are journaled in the sides $22^b$, and a series of rollers 24, whose pintles are journaled in the lower ends of the finger portions $22^g$, in order that said rollers 24, will lie close to the bottom of the tray. A small roller 25, is also mounted across the upper edge of the diaphragm $22^d$, with its end-pintles journaled in the lugs $22^i$. The tray 16, in turn, supports a main apron-driving roller 36, whose end-pintles are journaled in the lugs $16^c$, integral with and projecting from the end-wall $16^d$. It also supports the small rollers 27 and 28, mounted directly over its end-walls $16^d$ and $16^f$, and journaled in the lugs $16^e$ and $16^g$. Like rollers 29 and 30, are journaled directly over the compartment partitions $16^b$ and $16^c$, in the lugs $16^h$. A series of similar rollers 31, are mounted in each compartment with their pintles resting upon cleats 32, riveted to the tray walls and the roller 33, is journaled directly under the end-wall $16^f$, in the legs 17. The slots $22^e$, of the side pieces $22^b$, straddle the pintles of the rollers 31, which rest upon the cleats 32, and retain said pintles in proper position.

Two quincuncially perforated endless aprons 34 and 35, of suitable material, preferably thin celluloid, travel upon the several rollers as follows: Starting between the two rollers 23 and 28, which grip the aprons together in obedience to means hereinafter described, said aprons travel in contact with each other, downward and under one of the rollers 24, upward and over one of the rollers 31, downward and under the next roller 24, upward and over the next roller 31, and so on, until all of the rollers in the first compartment have been traversed. The aprons then pass upward above the level of the tray 16, and over the roller 29, which is journaled as aforesaid over the first compartment partition $16^b$, and then traverse the rollers 24 and 31, of the second compartment in the same manner as those of the first. After the traversing of the rollers of the second compartment, the aprons pass again above the level of the top of the tray and over the roller 30, journaled over a second compartment $16^c$. After next traversing the rollers 24 and 31 of the third or last compartment, the aprons pass over the roller 27, and between the main apron-driving rollers 26 and 36. The lower apron 35, then passes downward and under the tray 16, under the roller 33, and upward again to the roller 28, from which it started; while the upper apron 34, passes up around the roller 26, over the roller 25, of the diaphragm $22^d$, and back to the roller 23, from which it started.

The aprons 34, and 35, are driven in all their movements by the rollers 26 and 36, said rollers preferably being of the same diameter and revolving at the same speed and operatively connected together by two gear wheels 37 and 38, mounted securely upon their ends and the upper one 26, is positively driven by the lower. During all the movements of the rollers 26 and 36, they revolve in one direction indicated by the arrows 39, and a detent 40 is pivotally mounted upon the lug $16^e$ to engage the teeth of the wheel 38, and prevent said rollers from being accidentally turned backward.

In order to keep the aprons 35 and 34, stretched taut at all times, the lower one 35, is provided with an idle roller 41, which is mounted below the large roller 36, said roller 41, being supported and forced yieldingly against said aprons by two spring arms 42, engaging the pintles of said roller and riveted to the end wall $16^d$. The other apron 34, is provided with a like roller 43, crowded yieldingly to it by two spring arms 44, engaging its pintles and riveted to the diaphragm $22^d$.

The sides of the diaphragm $22^d$, project out over and clear of the sides of the tray 16, and have eyes $22^i$, engaged by tension helical springs 45 and 46. The spring 45 has its lower end hooked around the protuberance of the cock opening $21^b$, and the other spring 46, has its lower end hooked around a stud $16^i$, projecting from the tray 16. These springs act yieldingly to press the two rollers 26 and 36 together to grip and drive the aprons 34 and 35, and also to press the two rollers 23 and 28, together as aforesaid. As the rollers 24, are mounted in the frame-work 22, and the rollers 31, in the tray, the spring must exert sufficient tension to overcome the action of the aprons 34 and 35, to prevent them from lifting said frame-work 22, upward in the tray.

The shaft or pintle $36^b$, of the lower apron driving roller 36, extends through the drawer front 2, and is provided with a crank 47, for driving said roller; said crank being adapted to abut a stop pin 48, inserted securely into the drawer front for purposes later described. The crank is made of flexible sheet metal in order that it can be sprung outward to pass said pin.

Mounted with their faces in contact with each other below the back wall 8, of the exposing chamber 5, are two rollers 49 and 50, whose point of contact is in a line with or slightly back of the front face of said wall. The pintles of these rollers are journaled in the lugs $16^g$, projecting upwardly from the tray. The pintles of the smaller roller 50, engage eyes $16^k$, and those of the larger roller 49, rest in the ends of the slots $16^l$. These slots $16^l$, are provided with sliding blocks 51, which act against the pintles $49^b$, to press the roller 49, into contact with the smaller roller 50 and said blocks are adjusted by screws 52. It being necessary to remove the roller 49, to allow the frame-work 22, to be taken out of the tray 16, the slots $16^l$, are provided with outlet openings 16″, through which the pintles of said roller may pass after unscrewing the screw 52. The rollers 49 and 50, are jacketed with rubber or other suitable elastic material that their gripping contact may be slightly yielding and more easily adjusted by the screw 52. The peripheral measurement of the rollers 49 and 50, must be commensurate with each other to cause a given point on the larger roller to always meet the same point on the smaller; this arrangement being required to allow the use of a cutting or severing blade 53, which projects from the face of the roller 49, and which passes the roller 50, by dropping into the receiving groove $50^b$, of said roller. This blade is shown separately in Fig. 6, and fits tightly into a longitudinally undercut groove $49^c$, in its roller and in order to certainly sever the film 15, that passes between rollers 49 and 50, as later described, the edge of the blade is serrated or toothed to have a puncturing effect on the film to render it easily severed at the puncture line.

The rollers 49 and 50, are operatively connected with each other by toothed wheels 54 and 55, which mesh with each other and are secured to the ends of said rollers. The larger roller 49, is operatively connected with the large apron driving roller 26, at the opposite end of the structure by a link-belt 56. This belt 56, engages sprocket wheels 57 and 58; the wheel 58, being mounted securely upon the rigid end-pintle $26^b$, of the roller 26; and the wheel 57, loosely upon the pintle $49^b$, of the roller 49.

The sprocket wheel 57, has an integral hub-extension $57^b$, provided with inclined teeth $57^c$, and said teeth are adapted to engage the hooked end of a detent 59, which is pivoted to the end of the roller 49, through the wheel 54. The detent 59 is held normally in engagement with the teeth $57^c$, by a small spring 60, and is provided with an arm $59^b$, extending radially with the roller 49. At each revolution of the roller 49, and just as the blade 53 has fully entered and is just withdrawing from its groove 50, an arm $59^b$, of the detent 59, is caught by a hook $61^b$, on the end of the lever 61, and disengages said detent from the inclined teeth $57^c$, and interrupts the movement of said roller 49, until a period of action of other parts of the machine is completed. The lever 61, is pivotally secured at its central point to a lug $16^m$, projecting upward from the tray 16, and its end opposite the hook $61^b$, lies in the path of a projecting pin $26^c$, carried by the roller 26, and at each revolution of said roller 26, the pin $26^c$, trips said lever and causes the hook $61^b$, to release the detent 59.

In using the machine the compartments of the tray 16, are filled with the necessary developing, fixing, and washing solutions, and a spool 13, of the film 15 is mounted on the film chamber 9. The end of the film is brought up over the roller 62 and passes down through the exposing chamber 5, the said film is then caught by the two rollers 49 and 50, which stretch it tightly upon the face of the wall 8, in position for exposure. Positioned beneath the roller 50, and attached to an upper edge of the drawer 2, is a guiding apron *a*. This apron depends on a curve and terminates at a point above the plane of the rollers 28 and 23, and is intended to insure the positive delivery of the severed portions of the film between the aprons 34 and 35. After the exposure is made the crank 47, is turned to drive the parts and the rollers 49 and 50, draw the film down and insert its end between the aprons 34 and 35, at the rollers 23 and 28, a continued turning of the crank 47, bringing the operation to a point where the film is severed by the blade 53, as aforesaid. At this point, as before stated, the hook $61^b$, on the lever 61, disengages the roller 49, from its driving mechanism and said roller and its coacting roller 50, keep the film 15, stretched taut, in the exposing chamber 5, for another exposure, while the portion of the film below said rollers is severed from the remaining supply of film at the puncture line formed by the blade 53, and is drawn on down into the developing solution by the aprons 34 and 35. For convenience in setting the film 15, for each exposure and in order to have the exposed portions of the film follow each other into and through the developing solutions in proper order, the mechanism is so timed that the crank 47, shall abut the stop-pin 48, just as the exposed and detached portion of said film has been completely submerged in the developing solution. The stop-pin 48, is provided for arresting the crank when the crank has been turned to carry the film a predetermined distance into the tanks; the said crank abutting the stop pin at such intervals. To accomplish this, and in view of the fact that all rollers in the machine have the same peripheral speed, the peripheral measurement of the roller 49, is made less than that of the roller 26, by which said roller 49, is driven an amount approximately equal to the distance the film 15, will travel in passing from the contact point of the rollers 49 and 50, to the surface of the developing fluid. The pin 26$^{c}$, of the roller 26, comes in contact with the lever 61, approximately at the same instant that the crank 47, abuts the stop-pin 48, so that as said crank is slipping past said pin, said lever is tripped and the roller 49, begins its revolution with said crank, said roller completing its revolution and being stopped by said lever in time to allow the severed portions of film to be submerged in the developing fluid, before the crank again abuts the stop-pin. The exposed portions of the film pass between the aprons 34 and 35, through all of the developing, fixing, and washing solutions in the different compartments of the tray, the perforations of said aprons allowing the fluid to flow freely about said film and the film is finally delivered from between the aprons in the form of separate finished prints through the delivery opening 63, in the end of the casing 1.

In cases where it is desired to run a single portion of the film through the developing solution without following it by other portions in regular order, the eccentric stop 64, mounted upon the spindle 65, is turned down against the lever 61, so as to stop all further revolution of the roller 49, and when the lever 61, is thus locked, its elastic properties will allow the pin 26$^{c}$, of the roller 26, to pass it. One end of the spindle is mounted in and extends through a bracket or arm 66, depending from the top of the casing, while the opposite end portion of the spindle extends through and beyond the side of the casing. A turn-button 67, is secured to the exterior portion of the spindle for rotating the same. The cam 64, is secured to the free portion of the spindle, adjacent the arm 66.

It is to be stated that the term "film" used throughout the specification and the annexed claims may be any material employed in reproducing by subjecting to the light.

I claim—

1. An inclosing casing having an exposing chamber and means for drawing sensitive film through said chamber for exposure, a tray within the casing for holding developing fluid, a series of rollers mounted across its bottom, and a like series across its top, the upper rollers being supported by the tray walls, the lower rollers being supported by a removable frame-work, whereby they are removable from the tray between the upper rollers, and a pair of aprons adapted to travel over said rollers and subject the exposed film to the action of the developing fluid, the exposed film being mechanically drawn from the exposing chamber and delivered to the aprons.

2. An inclosing casing having means within it for exposing sensitive film to the light, a tray within the casing for holding the developing fluid, rollers mounted across the upper part of the tray with their pintles supported by the tray walls, a frame-work mounted within the tray, said frame-work having fingers extending down between the pintles of said rollers and supporting the pintles of said rollers at the bottom of the tray, and a pair of aprons adapted to travel upon the rollers and subject the exposed film to the action of the developing fluid, the exposed film being mechanically drawn from the exposing means and delivered to the aprons.

3. An inclosing casing having means for exposing sensitive film to the action of the light, a tray within the casing for holding developing fluid, a frame-work mounted within the tray, a pair of apron-driving rollers, one of said rollers being journaled in and supported by the tray, and the other by the frame-work, a pair of aprons adapted to be driven through the developing fluid by said rollers and subject the exposed film to the action of said fluid and an operative connection between the tray and said frame-work for causing said rollers to grip the aprons, the exposed film being mechanically drawn from the exposing means and delivered to the aprons.

4. An inclosing casing having means for exposing sensitive film to the action of light, a tray within said casing for holding developing fluid, a pair of rollers mounted in gripping contact with each other, at each end of the tray, a frame-work mounted within the tray, one roller of each pair being supported by the tray and the other by the frame-work, a pair of aprons adapted to be driven by said rollers and to subject the exposed film to the action of the developing fluid, and an elastic connection between the tray and the frame-work to cause said pairs of rollers to grip the aprons, the exposed film being mechanically drawn from the exposing means and delivered to the aprons.

5. An inclosing casing having means for exposing sensitive film to the action of light, a tray within said casing for containing developing fluid, a pair of apron-driving rollers mounted at each end of the tray, a series of apron-supporting rollers journaled across the top of the tray with their end-pintles supported by the tray walls, a second series of apron-supporting rollers journaled across the bottom of the tray, a frame-work mounted within the tray and having fingers extending down between the pintles of the first-named series of rollers, the lower ends of said fingers supporting the pintles of said second series of apron-supporting rollers, one roller of each of said pairs of apron-driving rollers being supported by the tray and the other by the frame-work, a pair of gripping aprons adapted to be driven in contact with each other by said driving rollers over the said supporting rollers for subjecting the exposed film to the developing fluid, and an elastic connection between the tray and the frame-work for causing the apron-driving rollers to grip the aprons, the exposed film being mechanically drawn from the exposing means and delivered to the aprons.

6. In a photographic and developing apparatus having a receptacle for developer, flexible aprons movable in the receptacle, said aprons being provided with transverse rows of perforations.

7. In a photographic and developing apparatus having a receptacle for developer, a pair of perforated flexible endless aprons movable into the receptacle and adapted to contact the opposite surfaces of a film.

8. In a photographic and developing apparatus, flexible perforated aprons adapted to carry an exposed film through a developing fluid in one direction.

9. An inclosing casing, means within the casing for holding a supply of sensitive film, a chamber in which to make proper exposure of film to light, a pair of gripping rollers adapted to draw the film through the exposing chamber and having mechanism associated with them for severing the film at regular intervals after it is drawn through the chamber, a tray within the casing for containing developing fluid, a pair of gripping aprons arranged to receive the severed portions of film from the gripping rollers and carry them through the developing fluid in the tray, means for driving the gripping rollers and the aprons, and means for stopping the movement of said rollers while each severed portion of the film is drawn into the developing fluid by the aprons, the exposed film being mechanically drawn from the exposing chamber and delivered to the aprons.

10. An inclosing casing adapted to contain a supply of sensitive film and having a chamber for making the proper exposure of said film to light, a pair of gripping rollers adapted to draw the film through the exposing chamber and sever said film at regular intervals, a tray within the casing for containing developing fluid, a pair of endless aprons arranged to circulate through the developing fluid in the tray and carry the severed portions of the film, mechanism for driving the gripping rollers and the aprons, and means for intermittently stopping the action of said rollers while the aprons continue in action, the exposed film being mechanically drawn from the exposing chamber and delivered to the aprons.

11. A casing adapted to hold a supply of sensitive film and having means for properly exposing said film to light, a drawer arranged to slide into the casing, a tray mounted within the drawer for holding developing fluid, and mechanism for subjecting the exposed film to the action of the fluid in the tray, said mechanism being supported by the drawer and removable from the casing therewith, the exposed film being mechanically drawn from the exposing means and delivered to the mechanism for subjecting the exposed film to the action of the fluid in the tray.

12. A casing adapted to hold a supply of sensitive film and having means for making the proper exposure of said film to light, a drawer arranged to slide into the casing, a tray mounted within the drawer for containing developing fluid, a pair of aprons mounted within the tray for carrying the exposed film through the developing fluid, a pair of rollers adapted to drive the aprons through the developing fluid, an end pintle of one of the rollers extending through the drawer front and having a crank for driving it, the exposed film being mechanically drawn from the exposing means and delivered to the aprons.

13. A casing having means for exposing sensitive film, a tray within the casing for holding developing fluid, means for subjecting the exposed film to the action of the developing fluid, the casing having the proper filling funnels and emptying cocks mounted permanently on the outside of one of the walls of said tray, said funnels and cocks having permanent communication with said tray through said wall, the exposed film being mechanically drawn from the exposing means and delivered to the mechanism for subjecting the exposed film to the action of the fluid in the tray.

14. An inclosing casing having an exposing chamber and means for drawing film through said chamber within the casing, a receptacle within the casing for holding developing fluid, and a pair of perforated aprons adapted to grip the film within the casing and carry said film through the receptacle, the exposed film being mechanically drawn from the exposing chamber and delivered to the aprons.

15. A casing attachable to a camera and having mechanism for exposing a sensitive film to the action of said camera, a drawer arranged to slide within and form a part of the casing, a tray mounted within the drawer for containing developing fluid, a pair of endless aprons mounted upon driving rollers and arranged to carry the exposed film through the developing fluid, a shaft or pintle of one of the driving rollers extending through a wall of the casing and having a crank for driving the aprons, and a pair of gripping rollers adapted to feed the exposed film into engagement with the aprons from the exposing mechanism.

16. A casing adapted to hold a supply of film and having a chamber in which to make the proper exposure of said film to light, said chamber being attachable to a camera, a pair of gripping rollers adapted to draw the film through said chamber, one of said rollers having a blade projecting from its face for severing the film at regular intervals, a tray within the casing for containing developing fluid, and a pair of gripping aprons adapted to receive the severed portions of the film from said gripping rollers and carry them through the developing fluid, the exposed film being mechanically drawn from the exposing chamber and delivered to the aprons.

17. A casing having within it a chamber adapted to hold a spool of sensitive film, an exposing chamber for making the exposure of said film to light, said exposing chamber being attachable to a camera, a tray within the casing for containing developing fluid, said tray being mounted within a drawer portion removable from the casing, a pair of film-gripping rollers mounted over one end of the tray and adapted to draw film from the exposing chamber, lugs extending upward from said tray, a framework mounted within the tray, a pair of apron gripping rollers mounted at each end of the tray, one roller of each pair being supported by the tray and the other by the frame-work, a pair of aprons adapted to be driven in gripping contact with each other by said apron gripping rollers through the developing fluid, said aprons being arranged to receive the film from the film-gripping rollers and carry it through the developing fluid.

18. In a photographic and developing apparatus having a receptacle for the developer, flexible aprons movable in the receptacle, said aprons having transverse rows of perforations quincuncially arranged.

19. An inclosing casing having an exposing chamber and means for drawing film through said chamber within the casing, a receptacle within the casing for holding fluid, and a pair of perforated aprons adapted to carry the film between them and within the casing through the receptacle and eject it from the casing, the exposed film being mechanically drawn from the exposing chamber and delivered to the aprons.

20. A casing having an exposing chamber to which a camera may be attached, a drawer working within the casing, a developer apparatus carried by the drawer, and means for securing the developer apparatus to the drawer, said means comprising a part of the developer apparatus, the exposed film being mechanically drawn from the exposing chamber and delivered to the developer apparatus.

21. An inclosing casing adapted to contain a supply of film and having a chamber for making the proper exposure of said film to light, a pair of gripping rollers adapted to draw the film through the exposing chamber and sever said film at intervals, one of said rollers being movable with relation to the other, a receptacle within the casing for containing developing fluid, aprons arranged to pass through the fluid within the receptacle and carry the severed portions of the film, and means for driving the gripping rollers and aprons, the exposed film being mechanically drawn from the exposing chamber and delivered to the aprons.

22. An inclosing casing adapted to contain a supply of film and having a chamber for making the proper exposure of said film to light, a receptacle within the casing for containing developing fluid, said receptacle having lugs provided with eyes and slots, a roller mounted in the eyes, a second roller mounted in the slots, means for forcing the rollers in the slots into contact with the other roller, said rollers being adapted to draw the film through the exposing chamber, means carried by the rollers for severing the film at intervals, aprons arranged to pass through the fluid within the receptacle and carry the severed portions of the film, and means for driving the gripping rollers and aprons, the exposed film being mechanically drawn from the exposing chamber and delivered to the aprons.

23. An inclosing casing adapted to contain a supply of film and having a chamber for making the proper exposure of said film to light, a receptacle in the casing for containing developing fluid, said receptacle having lugs provided with eyes and slots, a roller mounted in the eyes, a second roller mounted in the slots, blocks sliding in the slots and bearing against the roller, means for imparting movement to the blocks, said rollers being adapted to draw the film through the exposing chamber and to sever the film at intervals, aprons arranged to pass through the fluid in the receptacle and to carry the severed portions of the film, and means for operating the rollers and the aprons, the exposed film being mechanically drawn from the exposing chamber and delivered to the aprons.

24. An inclosing casing adapted to contain a supply of film, and having a chamber for making the proper exposure of said film to light, a receptacle within the casing for containing a developing fluid, said receptacle having lugs provided with eyes and slots, a roller mounted in the eyes, a second roller mounted in the slots, blocks sliding in the slots and bearing against the roller, a screw for operating said blocks, said rollers being adapted to draw the film through the exposing chamber and to sever the film at intervals, aprons arranged to pass through the fluid in the receptacle and to carry the severed portions of the film, and means for operating the rollers and aprons, the exposed film being mechanically drawn from the exposing chamber and delivered to the aprons.

25. An inclosing casing adapted to contain a supply of film and having an exposing chamber for making the proper exposure of said film to light, a pair of gripping rollers adapted to draw the film through the exposing chamber and sever the said film at intervals, a receptacle within the casing for containing the developing fluid, aprons arranged to pass through the fluid within the receptacle and to carry the severed portions of the film and means for driving the rollers and the aprons, the exposed film being mechanically drawn from the exposing chamber and delivered to the aprons.

26. An inclosing casing adapted to contain a supply of film and having an exposing chamber for making the proper exposure of film to light, a pair of gripping rollers adapted to draw the film through the exposing chamber, a cutting blade carried by one of the rollers for severing the film at intervals, a receptacle within the casing for containing developing fluid, aprons arranged to pass through the fluid in the receptacle and to carry the severed portions of the film, and means for driving the gripping rollers and the aprons, the exposed film being mechanically drawn from the exposing chamber and delivered to the aprons.

27. An inclosing casing adapted to contain a supply of film and having a chamber for making the proper exposure of the film to light, means within the casing for drawing the film through the exposing chamber and severing the film at intervals, a receptacle within the casing for containing developing fluid, and means for carrying the severed portions of the film through said fluid, the exposed film being mechanically delivered from the drawing and severing means to the means for carrying the severed portions of the film through said fluid.

28. An inclosing casing adapted to contain a supply of film and having a chamber for making exposure of the film to light, means within the casing for drawing the film through the exposing chamber and into the casing, mechanically operated means for severing the film, a receptacle within the casing for containing developing fluid, and means for carrying the severed portions of the film through said fluid.

29. An inclosing casing adapted to contain a supply of film and having an exposing chamber for making the proper exposure of the film to light, gripping rollers for drawing said film through the exposing chamber, a cutting blade carried by one of the rollers for severing the film at intervals, a receptacle within the casing for containing developing fluid, and means for carrying the severed portions of the film through the fluid, the exposed film being mechanically drawn from the exposing chamber, and delivered to the means for carrying the severed portions of the film through the fluid.

30. An inclosing casing adapted to contain a supply of film and having a chamber for making the proper exposure of the film to light, gripping rollers for drawing said film through the exposing chamber, a cutting blade carried by one of the rollers for severing the film at intervals, said blade having its cutting edge toothed, a receptacle within the casing for containing developing fluid, and means for carrying the severed portions of the film through the fluid, the exposed film being mechanically drawn from the exposing chamber and delivered to the means for carrying the severed portions of the film through the fluid.

31. An inclosing casing adapted to contain a supply of film and having a chamber for making the proper exposure of the film to light, gripping rollers for drawing said film through the exposing chamber, one of said rollers being provided with a groove, a cutter blade carried by the other roller adapted to extend within the groove and sever the film at intervals, a receptacle within the casing for containing developing fluid, and means for carrying the severed portions of the film through the fluid, the exposed film being mechanically drawn from the exposing chamber and delivered to the means for carrying the severed portions of the film through the fluid.

32. An inclosing casing adapted to contain a supply of film and having a chamber for properly exposing the film to light, gripping rollers for drawing said film through the chamber and to sever said film at intervals, aprons for carrying the severed portions of the film, a receptacle within the casing for containing a developing fluid, said aprons being adapted to pass through said fluid, means for operating the aprons, and connections between the apron operating means and the gripping rollers for operating said rollers, the exposed film being mechanically drawn from the exposing chamber and delivered to the means for carrying the severed portions of the film through the fluid.

33. An inclosing casing adapted to contain a supply of film and having an exposing chamber for making the proper exposure of said film to light, gripping rollers for drawing the film through the exposing chamber, a toothed wheel carried by each roller meshing one with the other, a receptacle in the casing for holding developer fluid, and means for carrying the film through the fluid, the exposed film being mechanically drawn from the exposing chamber and delivered to the means for carrying the film through the fluid.

34. An inclosing casing adapted to contain a supply of film and having an exposing chamber for making the proper exposure of said film to light, gripping rollers for drawing the film through the exposing chamber, a toothed wheel carried by each roller meshing one with the other, a receptacle within the casing for holding developing fluid, and means for carrying the film through the fluid, the exposed film being mechanically drawn from the exposing chamber and delivered to the means for carrying the film through the fluid.

35. An inclosing casing adapted to contain a supply of film and having a chamber for exposing said film to light, gripping rollers operatively connected one to the other for drawing said film through the exposing chamber, means for severing the film, said gripping rollers also holding the film within the chamber taut, a receptacle within the casing for containing developing fluid, and means for carrying the severed portions of the film through the fluid, the exposed film being mechanically drawn from the exposing chamber and delivered to the means for carrying the film through the fluid.

36. An inclosing casing adapted to contain a supply of film and having an exposing chamber for making the proper exposure of the film to light, gripping rollers for drawing said film through the exposing chamber, means for severing the film at intervals, a fluid holder within the casing, aprons for carrying the severed portions of the film through the fluid contained within the holder, means for operating the aprons, and means whereby the apron operating means drives the gripping rollers, the exposed film being mechanically drawn from the exposing chamber and delivered to the aprons.

37. An inclosing casing adapted to contain a film and having a chamber for exposing said film to light, gripping rollers for drawing said film through the chamber, means for severing the film at intervals, a fluid holder within the casing, aprons for carrying the severed portions of the film through the fluid contained within the holder, driving wheels for the aprons, and connections between the driving wheels and gripping rollers for operating said rollers, the exposed film being mechanically drawn from the exposing chamber and delivered to the aprons.

38. An inclosing casing adapted to contain a film and having a chamber for exposing said film to light, gripping rollers for drawing said film through the chamber, means for severing the film at intervals, a fluid holder within the casing, aprons for carrying the severed portions of the film through the fluid contained within the holder, driving wheels for the aprons, a connection between the driving wheels and the gripping rollers for operating said rollers, mechanism for operating the driving wheels, and means for preventing movement of the driving wheels in one direction, the exposed film being mechanically drawn from the exposing chamber and delivered to the aprons.

39. An inclosing casing adapted to contain a film and having a chamber for exposing said film to light, gripping rollers for drawing the film through the chamber, means for severing the film at intervals, a fluid holder within the casing, aprons for carrying the severed portions of the film through the fluid contained within the holder, driving wheels for the aprons, a connection between the driving wheels and gripping rollers for operating the said rollers, means for operating the driving wheels, and means carried by the fluid holder for preventing movement of the driving wheels in one direction, the exposed film being mechanically drawn from the exposing chamber and delivered to the aprons.

40. An inclosing casing adapted to contain a supply of film and having a chamber for making proper exposure of the film to light, gripping rollers for drawing said film through the chamber, means for severing the film at intervals, a fluid holder arranged within the casing, aprons for carrying the severed portions of the film through the fluid contained within the holder, driving wheels for the aprons, meshing gear wheels carried by the driving wheels, a detent secured to the holder and engaging the teeth of one of the gear wheels for holding said wheels against movement in one direction, a connection between the driving wheels and gripping rollers for operating said rollers, and means for operating the driving wheels, the exposed film being mechanically drawn from the exposing chamber and delivered to the aprons.

41. An inclosing casing adapted to contain a supply of film and having a chamber for making the proper exposure of the film to light, gripping rollers for drawing the said film through the chamber, means for severing the film at intervals, a sprocket wheel mounted loosely with relation to one of the rollers, means for causing the roller to travel with said sprocket wheel, a fluid holder within the casing, aprons for carrying the severed portions of the film through the fluid contained within the holder, driving wheels for the aprons, a connection between the driving wheels and the sprocket wheels for operating the same, and means for operating the driving wheels, the exposed film being mechanically drawn from the exposing chamber and delivered to the aprons.

42. An inclosing casing having a supply of film therein and a chamber for exposing the film to the light, gripping rollers for drawing said film through the chamber, means for severing the film at intervals, a sprocket wheel mounted loosely with relation to one of the rollers, a toothed extension formed on the sprocket wheel, a detent carried by the roller for normally engaging the teeth of the extension, aprons for carrying the severed portions of the film, a fluid holder within the casing, said aprons passing therethrough, driving wheels for the aprons, and a connection between the driving wheels and the sprocket wheel for operating said sprocket wheel, the exposed film being mechanically drawn from the exposing chamber and delivered to the aprons.

43. An inclosing casing having a supply of film therein and a chamber for making a proper exposure of the film to light, gripping rollers for drawing said film through the chamber, means for severing the film at intervals, a sprocket wheel mounted loosely with relation to one of the rollers, a toothed extension on the sprocket wheel, a detent carried by the roller normally engaging the toothed extension, a fluid holder within the casing, aprons arranged to carry the severed portions of the film through the fluid contained within the holder, driving wheels for the aprons, a connection between the driving wheels and the sprocket wheel for operating the said sprocket wheel, and means controlled by the driving wheels for disengaging the detent from the toothed extension, the exposed film being mechanically drawn from the exposing chamber and delivered to the aprons.

44. An inclosing casing adapted to contain a film and having a chamber for exposing said film to light, gripping rollers for drawing said film through the casing, driving wheels for operating the rollers, means for severing the film at intervals, a sprocket wheel mounted loosely with relation to one of the rollers, a detent carried by the roller, an extension carried by the sprocket wheel normally engaged by the detent, a lever pivoted within the casing adapted to disengage the detent from the extension, a fluid holder within the casing, aprons for carrying the severed portions of the film through the fluid contained within the holder, a connection between the sprocket wheel and driving wheels for operating the rollers, and means for operating the wheels, the exposed film being mechanically drawn from the exposing chamber and delivered to the aprons.

45. An inclosing casing adapted to contain a film and having a chamber for exposing said film, gripping rollers for drawing the film through the casing, means for severing the film at intervals, driving wheels for operating the rollers, a sprocket wheel mounted loosely with relation to one of the rollers, a detent carried by the roller normally engaging the sprocket wheel to cause the same to rotate therewith, a lever pivoted within the casing adapted to disengage the said detent from the sprocket wheel, a fluid holder within the casing, aprons for carrying the severed portions of the film through the fluid contained within the holder, a connection between the sprocket wheel and the driving wheels for operating the rollers, and means for operating the wheels, the exposed film being mechanically drawn from the exposing chamber and delivered to the aprons.

46. An inclosing casing adapted to contain film and having a chamber for exposing said film, gripping rollers adapted to draw the film through the casing, and to sever the film at intervals, a sprocket wheel mounted loosely with relation to one of the rollers, a detent carried by the roller normally engaging the sprocket wheel to cause the same to rotate with the roller, a lever pivoted within the casing adapted to disengage said detent from the sprocket wheel, a fluid holder within the casing, aprons for carrying the severed portions of the film through the fluid contained within the holder, a connection between the driving wheels and the sprocket wheel for operating the same, means carried by one of the driving wheels for causing the lever to disengage the detent from the sprocket wheel, and means for operating the wheels, the exposed film being mechanically drawn from the exposing chamber and delivered to the aprons.

47. An inclosing casing adapted to contain film and having a chamber for exposing said film, gripping rollers adapted to draw the film through the chamber and to sever the film at intervals, a sprocket wheel mounted loosely with relation to one of the rollers, a detent carried by the roller adapted to engage the sprocket wheel to rotate therewith, a lever pivoted intermediate its length, one end of said lever being adapted to contact with the detent and disengage it from the sprocket wheel, a fluid holder within the casing, aprons for carrying the severed portions of the film through the fluid contained within the holder, driving wheels for the aprons, a connection between the driving wheels, a pin carried by one of the driving wheels for contacting with one end of the lever to force the opposite end out of contact with the detent, and means for operating the driving wheels, the exposed film being mechanically drawn from the exposing chamber and delivered to the aprons.

48. An inclosing casing having an exposing chamber, means for drawing film through said chamber for exposing the film, means for severing the same, a receptacle within the casing for holding developing fluid, means for carrying the severed portions of the film through the receptacle, said drawing means and carrying means being operatively connected, and means whereby the drawing means is held positively inoperative independent of the carrying means, the exposed film being mechanically drawn from the exposing chamber and delivered to the means for carrying the severed portions of the film through the receptacle.

49. An inclosing casing having an exposing chamber, means for drawing film through said chamber for exposing and severing the same, a receptacle within the casing for holding the developing fluid, means for carrying the severed portions of film through the receptacle, said drawing means and carrying means being operatively connected, and a cam adapted to hold the drawing means inoperative independent of the carrying means, the exposed film being mechanically drawn from the exposing chamber and delivered to the means for carrying the severed portions of the film through the receptacle.

50. An inclosing casing having an exposing chamber, means for drawing film through said chamber for exposing and severing the same, a receptacle within the casing for holding developing fluid, means for carrying the severed portions of film through the receptacle, said drawing means and carrying means being operatively connected, and a cam operated from the exterior of the casing adapted to hold the drawing means inoperative independent of the carrying means, the exposed film being mechanically drawn from the exposing chamber and delivered to the means for carrying the severed portions of the film through the receptacle.

51. An inclosing casing having means for exposing film, a receptacle within the casing for holding developing fluid, means for drawing the film and severing the same, means for carrying the severed portions of the film through the fluid in the receptacle, means for operating the same, and a stop for the operating means to indicate when a portion of the film has been severed and submerged within the fluid, said film being mechanically delivered from the means for severing the film to the means for carrying the severed portions of the film through the receptacle.

52. An inclosing casing having an exposing chamber and a delivery opening, means for drawing film through the chamber within the casing, a receptacle within the casing adapted to contain fluid, and a pair of perforated aprons adapted to grip and carry the film within the casing through the receptacle and to eject said film through the discharge opening, the exposed film being mechanically drawn from the exposing chamber and delivered to the aprons.

53. An inclosing casing having an exposing chamber, means within the casing for drawing film through the exposing chamber within the casing, a receptacle adapted to contain fluid within the chamber, means for carrying the film through the receptacle, and means arranged beneath the drawing means for guiding the film to the carrying means, the exposed film being mechanically drawn from the exposing chamber and delivered to the means for carrying the film through the receptacle.

54. A casing having an exposing chamber adapted to contain film, means for drawing said film within the casing and severing the same, a drawer fitting within the casing, a receptacle on said drawer adapted to contain fluid, means for carrying the severed films through the receptacle, and means secured to an edge of the drawer for guiding the severed films to the carrying means, the exposed film being mechanically drawn from the exposing chamber and delivered to the means for carrying the severed portions of the film through the receptacle.

55. An inclosing casing having an exposing chamber adapted to contain film, means for drawing film within the casing and severing the same, developing apparatus within the casing, means for carrying the film through said developing apparatus, and a stationary apron to guide the film to said carrying means, the exposed film being mechanically drawn from the exposing chamber and delivered to the means for carrying the film through the developing apparatus.

56. An inclosing casing having an exposing chamber adapted to contain film, means for drawing the film within the casing and severing the same, developing apparatus within the casing, means for carrying the film through said developing apparatus, and a depending stationary apron to guide the film to said carrying means, the exposed film being mechanically drawn from the exposing chamber and delivered to the means for carrying the film through the developing apparatus.

57. A casing having an exposing chamber adapted to contain film, means for drawing said film within the casing and severing the same, a drawer fitting within the casing, a receptacle on said drawer adapted to contain fluid, means for carrying the severed films through the receptacle, and a downwardly curved stationary apron secured to an edge of the drawer to guide the film to the carrying means, the exposed film being mechanically delivered from the severing means to the means for carrying the severed films through the receptacle.

58. An inclosing casing having means for exposing film, a receptacle within the casing for holding developing fluid, means for drawing the film and severing the same, and means for carrying the severed portions of the film through the receptacle, the said film being mechanically delivered from the exposing chamber to the means for carrying the severed portions of the film through the receptacle, means for operating the drawing means, and a stop acting in conjunction with the operating means to indicate when a portion of the film has been severed and submerged in the fluid 59. An inclosing casing having an exposing chamber, means for drawing the film through said chamber and severing the same, a receptacle within the casing for holding developing fluid, the said film being mechanically delivered from the exposing chamber to the means for carrying the severed portions of the film through the receptacle, means for carrying the severed film through the receptacle, said drawing means and carrying means being operatively connected, an arm depending from the top of the casing, a spindle mounted in said arm and a side of the casing, a cam on the spindle adapted to hold the drawing means inoperative independent of the carrying means, and means for operating the spindle.

60. An inclosing casing having an exposing chamber, means for drawing the film through said chamber and severing the same, a receptacle within the casing for holding developing fluid, the said film being mechanically delivered from the exposing chamber to a means for carrying the severed portions of the film through the receptacle, means for carrying the severed films through the receptacle, said drawing means and carrying means being operatively connected, a spindle mounted within the casing, a cam fixed on the spindle adapted to hold the drawing means inoperative independent of the carrying means, and means for operating the spindle.

61. In a photographic and developing apparatus having a receptacle for the developer, a pair of perforated aprons movable into the receptacle and adapted to contact the opposite surfaces of a film.

62. An inclosing casing adapted to contain a supply of film and having a chamber for making an exposure of the film to light, a receptacle within the casing for containing developing fluid, means for carrying the severed portions of film through said fluid, means for drawing the film through the exposing chamber and delivering it to the film carrying means within the casing, and mechanically operated means for severing the film.

63. An inclosing casing adapted to contain a supply of film and having a chamber for making exposure of the film to light, means within the casing for carrying the film through developing fluid, means for drawing the film through the exposing chamber, mechanically operated means for severing the film, and means for drawing the film from the severing means to the carrying means.

64. An inclosing casing adapted to contain a supply of film and having a chamber for making exposure of the film to light, means within the casing for carrying film through developing fluid, means for drawing the film through the exposing chamber, mechanically operated means for severing the film after each exposure, and means for drawing the film from the severing means to the carrying means.

65. An inclosing casing adapted to contain a supply of film and having a chamber for making an exposure of the film to light, means for drawing the film through the exposing chamber, means for severing the film; a receptacle within the casing for containing developing fluid, means for carrying the film through the developing fluid, and means for automatically delivering the film to the carrier.

66. An inclosing casing adapted to contain a supply of film and having a chamber for making an exposure of the film to light, means for drawing the film through the exposing chamber, means for severing the film, a receptacle within the casing for containing developing fluid, means for carrying the film through the developing fluid, and means for automatically delivering successive films to the carrying means.

67. An inclosing casing adapted to contain a supply of film and having an exposing chamber for making exposure of said film to light, operatively connected gripping rollers for drawing the film through the exposing chamber, a receptacle within the casing for holding developing fluid, and means for carrying the film through the fluid.

68. A developing apparatus having a source of supply from which film is drawn, means for exposing the film to light in operative relation to the developing apparatus, means for severing the film, means for carrying film in the developing apparatus, and means for removing the film from the carrying means.

69. An inclosing casing adapted to contain a supply of film and having a chamber for making exposure of the film to the light, means within the casing drawing the film through the exposing chamber and into the casing, means for severing the film after each exposure, a receptacle within the casing for containing developing fluid, means for carrying the severed portions of the film through said fluid, and means for delivering the film to the carrier.

70. In a photographic and developing apparatus, a receptacle, aprons movable through the receptacle, driving rollers for operating the aprons, means for rotating the rollers, and means for obstructing the rotation thereof.

71. A developing apparatus having means for exposing film to light, a perforated carrier for the film, said carrier supporting the entire surface of the film except where said carrier is perforated.

72. A developing apparatus having a source of supply from which film is drawn, means for exposing a sensitive film to light in operative relation to the developing apparatus, means for delivering the film to the developing apparatus, means for carrying the film through the developing apparatus, and means for removing the film from the carrier.

73. An apparatus closed against actinic light adapted to contain a supply of sensitive film and having an exposing chamber for exposing the film to the action of actinic light, means for drawing film from the exposing chamber, means for severing the film, means for developing the same, and means for ejecting the film from the apparatus, the exposed film being mechanically drawn from the exposing chamber and delivered to the means for developing the same.

74. An apparatus to develop sensitive paper having means for exposing the paper to light, means for severing the paper into appropriate lengths, means for carrying the paper through the developing apparatus, and means for ejecting the paper, the exposed paper being mechanically drawn from the means for exposing the paper and delivered to the developing apparatus.

75. A developing apparatus having a source of supply from which film is drawn, and means for exposing a sensitive film to light in operative relation to the developing apparatus, means for delivering the film to the developing apparatus, means for carrying the film through the developing apparatus, and means for ejecting it, the exposed film being mechanically drawn from the means for exposing the film and delivered to the developing apparatus.

In testimony whereof I affix my signature in the presence of two witnesses this 29th day of December, 1906.

GEORGE C. BEIDLER.

Witnesses:

LON. W. OWEN,

J. A. PETTIS.